(12) United States Patent
Suyama et al.

(10) Patent No.: US 11,705,553 B2
(45) Date of Patent: Jul. 18, 2023

(54) METHOD FOR PRODUCING COMPOSITE ALLOY AND METHOD FOR PRODUCING ELECTRODE

(71) Applicant: TOYOTA JIDOSHA KABUSHIKI KAISHA, Toyota (JP)

(72) Inventors: Hiroshi Suyama, Mishima (JP); Makio Kon, Mishima (JP); Naotaka Sawada, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 17/496,979

(22) Filed: Oct. 8, 2021

(65) Prior Publication Data

US 2022/0140323 A1 May 5, 2022

(30) Foreign Application Priority Data

Oct. 30, 2020 (JP) .................................. 2020-182676

(51) Int. Cl.
*H01M 4/38* (2006.01)
*H01M 4/04* (2006.01)
(Continued)

(52) U.S. Cl.
CPC .................. *H01M 4/38* (2013.01); *B22F 9/08* (2013.01); *H01M 4/0471* (2013.01);
(Continued)

(58) Field of Classification Search
CPC ...... H01M 4/38; H01M 4/0471; H01M 4/366; H01M 2004/021; H01M 4/049; H01M 4/24; H01M 10/24; H01M 4/26; H01M 4/383; H01M 4/242; B22F 9/08; B22F 2301/205; C23C 18/1692; C23C 18/1844; C23C 18/42; C22C 1/0466; C22C 1/0458; C22C 14/00
See application file for complete search history.

(56) References Cited

U.S. PATENT DOCUMENTS

2016/0315357 A1* 10/2016 Matsunaga ........... H01M 4/622
2018/0123126 A1* 5/2018 Kon ...................... H01M 10/24

FOREIGN PATENT DOCUMENTS

| JP | 2003-286508 A | 10/2003 |
|----|---------------|---------|
| JP | 2004-277862 A | 10/2004 |
| JP | 2016-207466 A | 12/2016 |

* cited by examiner

*Primary Examiner* — Stewart A Fraser
(74) *Attorney, Agent, or Firm* — Sughrue Mion, PLLC (57) ABSTRACT

Provided is a method for producing a composite alloy for use in an electrode for an alkaline storage battery, including a powder preparation step of preparing a hydrogen storage alloy powder containing Ti and Cr and having a BCC structure, an etching step of applying an acid to the hydrogen storage alloy powder prepared in the powder preparation step, a Pd film forming step of coating the surface of the hydrogen storage alloy powder subjected to the etching step with Pd using a substitution plating method, and a heat treatment step of heating the hydrogen storage alloy powder having a Pd film formed, at said heating being a temperature of 500° C. or less, wherein in the Pd coating forming step, the hydrogen storage alloy powder is coated with Pd under the condition that the Pd element weight ratio of the composite alloy to be produced is 0.47% or more.

4 Claims, 6 Drawing Sheets

(51) Int. Cl.
  *B22F 9/08* (2006.01)
  *H01M 4/36* (2006.01)
  *H01M 4/02* (2006.01)
(52) U.S. Cl.
  CPC ....... *H01M 4/366* (2013.01); *B22F 2301/205* (2013.01); *H01M 2004/021* (2013.01)

METHOD FOR PRODUCING COMPOSITE ALLOY AND METHOD FOR PRODUCING ELECTRODE

FIELD

The present application relates to a method for producing a composite alloy for use in an electrode for an alkaline storage battery, and a method for producing an electrode for an alkaline storage battery.

BACKGROUND

A composite alloy having a catalyst phase such as Pd formed in a hydrogen storage alloy is known for use as an electrode material for an alkaline storage battery. The composite alloy is used because charge and discharge activity cannot be obtained in the hydrogen storage alloy itself.

For example, Patent Document 1 discloses a process of obtaining a composite alloy, the process including: coating the surface of a hydrogen storage alloy powder that includes Ti, Cr and V, and has a BCC structure with Pd using a sputtering method, and then subjecting the Pd-coated powder to a heat treatment at a temperature of 62° C. or higher to 735° C. or less to obtain the composite alloy.

CITATION LIST

Patent Literature

Patent Literature 1: JP 2016-207466 A

SUMMARY

Technical Problem

The hydrogen storage alloy powder used in the process of Patent Document 1 is a three-element-based material (i.e., titanium (Ti), chromium (Cr), and vanadium (V)). Therefore, when the composite alloy obtained by the process is applied to an alkaline storage battery, V is eluted into the electrolytic solution. As a result, there is a problem that the battery performance becomes unstable. On the other hand, when using a two-element hydrogen storage alloy powder of Ti and Cr (e.g., a hydrogen storage alloy powder that substantially contains only Ti and Cr and does not contain V), and when the heat treatment is performed at a temperature of 628° C. or higher to 735° C. or less disclosed by Patent Document 1, there is a problem in that the BCC structure of the hydrogen storage alloy powder is collapsed, and sufficient discharge capacity cannot be obtained. In addition, in Patent Document 1, sputtering is used for coating Pd. Since sputtering is performed in a vacuum environment, the costs required for mass production of the composite alloy tend to be greatly increased. For at least the reasons explained above, there is room for improvement in the production side of the composite alloy.

Accordingly, one object of the present disclosure is to provide a method producing a composite alloy having a high discharge capacity while suppressing manufacturing costs in view of the technical problems noted above.

Solution to Problem

The present disclosure provides, as one means for solving the above problems, a method for producing a composite alloy for use in an electrode for an alkaline storage battery, the method including a powder preparation step of preparing a hydrogen storage alloy powder having a BCC structure and containing Ti and Cr, an etching step of applying an acid to the hydrogen storage alloy powder prepared in the powder preparation step, a Pd film forming step of coating the surface of the hydrogen storage alloy powder subjected to the etching step with Pd using a substitution plating method, and a heat treatment step of heating the hydrogen storage alloy powder having the Pd film formed, said heating being at a temperature of 500° C. or less, wherein in the Pd film forming step, the hydrogen storage alloy powder is coated with Pd under the condition that a Pd element weight ratio of the composite alloy to be produced is 0.47% or more (i.e., a weight ratio of Pd is 0.47% or more when a total weight of the composite alloy is considered to be 100%).

In the above Pd film forming step, the hydrogen storage alloy powder may be coated with Pd under the condition that the ratio of the Pd element weight ratio to the specific surface area of the composite alloy is equal to or higher than 0.22 g/m$^2$. Further, the hydrogen storage alloy may contain Ti and Cr and may be substantially free of other elements. In some embodiments, the hydrogen storage alloy is substantially free of V or does not contain any V.

Further, as one means for solving the above problems, the present disclosure provides a method for producing an electrode for an alkaline storage battery, comprising a step of preparing an electrode using the composite alloy produced by the above production method for producing a composite alloy, wherein a voltage difference between a charge voltage and a discharge voltage of the electrode is 0.45 or less.

Advantageous Effects

The method for producing a composite alloy of the present disclosure uses a hydrogen storage alloy powder containing Ti and Cr. When a composite alloy produced by such a hydrogen storage alloy powder is applied to an electrode of an alkaline storage battery, since Ti and Cr in the hydrogen storage alloy powder are hardly eluted into an alkaline solution which is an electrolytic solution, destabilization of battery performance is suppressed. Further, by using a substitution plating method in the formation of the Pd film, it is possible to decrease manufacturing costs as compared with the sputtering method. Further by setting the heat treatment temperature to 500° C. or less, while forming a catalyst phase containing Pd, it is possible to maintain the BCC crystal structure of the base material. In addition, in the Pd film forming step, by coating the hydrogen storage alloy powder with Pd under the condition that the Pd element weight ratio of the composite alloy is 0.47% or more, it is possible to improve the discharge capacity of the composite alloy to be produced.

In addition, according to the method for producing an electrode for an alkaline storage battery of the present disclosure, a voltage difference between the charging voltage and the discharging voltage of the electrode can be 0.45 V or less. As a result, the utilization rate of the capacity is high and stable charging and discharging characteristics can be provided.

DETAILED DESCRIPTION OF EMBODIMENTS

[Method for Producing a Composite Alloy]

Figure 1:
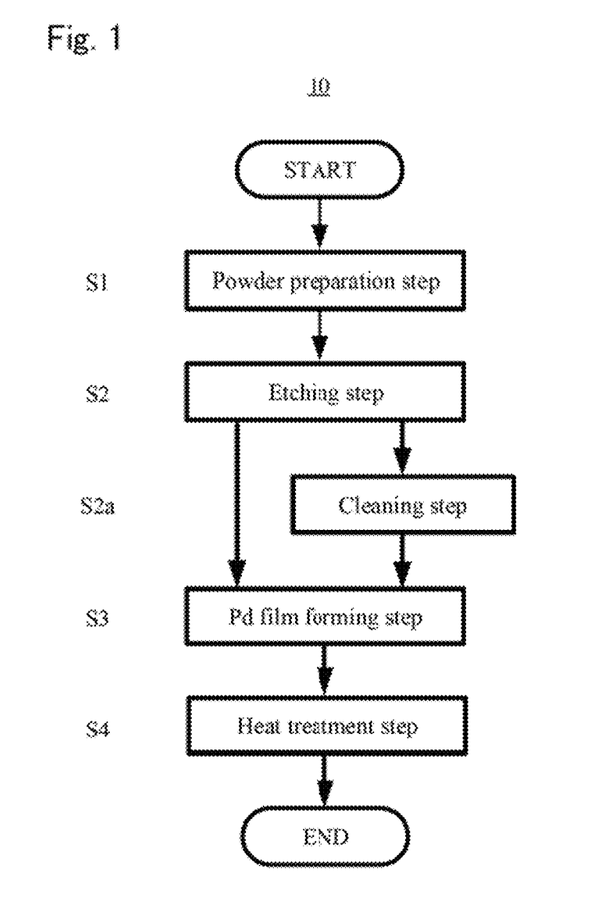
FIG. 1 is a flowchart of the production method 10.

A method for producing a composite alloy of the present disclosure will be described using the following method 10 of producing a composite alloy, which is an embodiment of the present disclosure (hereinafter, sometimes referred to as "production method 10"). FIG. 1 shows a flowchart of the manufacturing method 10.

The production method 10 is a method for producing a composite alloy used for an electrode for an alkaline storage battery, and includes the following steps. The production method 10 includes a powder preparation step S1, an etching step S2, a Pd film forming step S3, and a heat treatment step S4. Further, the production method 10 may optionally include a cleaning step S2a. Here, steps other than the heat treatment step S4 may be performed in an (oxygen-containing) atmosphere, or may be performed in an inert gas atmosphere such as Ar (glove box), but it is preferable to perform steps other than the heat treatment step S4 in an inert gas atmosphere because passivity can be formed in the hydrogen storage alloy powder by contact with oxygen.

<Powder Preparation Step S1>

The powder preparation step S1 is a step of preparing a hydrogen storage alloy powder containing Ti and Cr and having a BCC structure. When a composite alloy produced using such a hydrogen storage alloy powder is applied to an electrode of an alkaline storage battery, Ti and Cr contained in the base material of the composite alloy are hardly eluted into an alkaline solution (which is an electrolytic solution of the battery), which suppresses unstable battery performance.

The powder preparation step S1 may be any known method as long as such a hydrogen storage alloy powder can be produced, and the form thereof is not particularly limited. For example, the hydrogen storage alloy powder can be produced by a known method of quenching a metal melt, such as a gas atomization method or a roll quenching method.

The crystal structure of the hydrogen storage alloy powder prepared by the powder preparation step S1 is a BCC structure. When the crystal structure is a BCC structure, high charge and discharge activity can be obtained under the condition that a catalyst phase is formed.

The hydrogen storage alloy powder may contain elements other than Ti and Cr as long as the BCC structure can be maintained. For example, an element such as Mo may be contained in the composition of the hydrogen storage alloy powder.

Alternatively, the hydrogen storage alloy powder may be substantially free of elements other than Ti and Cr. Further, the hydrogen storage alloy powder may be made exclusive of Ti and Cr (i.e., a pure TiCr alloy). Since Ti and Cr are hardly eluted into an alkaline solution for use as an electrolytic solution of the alkaline storage battery, destabilization of battery performance can be further suppressed by using such a hydrogen storage alloy powder.

Here, "substantially free of other elements" permits errors and the like in manufacturing and unavoidable impurities. To contain elements other than Ti and Cr are is acceptable as long as the content thereof is in a trace amount so that the effect thereof is negligible. Thus, the term "substantially free of other elements" means herein that the content of the total of Ti and Cr in the hydrogen storage alloy powder is 99.9 at % or more. In some embodiments, the total content of Ti and Cr in the hydrogen storage alloy powder is preferably 99.95 at % or more, more preferably 99.97 at % or more.

The composition ratio of Ti and Cr is preferably a composition ratio such that the metastable phase of the crystal structure of the hydrogen storage alloy powder is a BCC structure. This is because high hydrogen absorption and emission capacity can be realized by a BCC structure. TiCr alloys, which can achieve higher hydrogen absorption and emission capacities in relatively easy-to-obtain Ti and Cr, are advantageous in terms of material-cost per resource risk/capacity. Since the metastable phase of Ti and Cr is always a BCC structure, the ratio of Ti and Cr is not particularly limited. However, when the powder is used as a negative electrode active material, from the viewpoint of hydrogen equilibrium pressure, the composition ratio is preferably in the range of Ti:Cr=30:70 to 70:30 (at %), and more preferably in the range of Ti:Cr=40:60 to 60:40 (at %)

The particle size of the hydrogen storage alloy powder is not particularly limited and is appropriately set according to the desired battery performance. For example, the particle diameter range can be appropriately set in a range of 1 μm to 1000 μm. It may be adjusted using a sieve or adjusted by performing a grinding treatment so as to have a desired particle size range.

<Etching Step S2>

The etching step S2 is performed after the powder preparation step S1. The etching step S2 is a step of applying an acid to the hydrogen storage alloy powder prepared in the powder preparation step S1. The etching step S2 is a pretreatment step to be performed prior to the Pd film forming step S3. The etching step S2 can remove a passive film present on the surface of the hydrogen storage alloy powder to activate that powder and/or to facilitate the Pd film forming step S3.

There is no particular limitation on the method of applying an acid to the hydrogen storage alloy powder as long as the passive film on the surface can be removed. Example thereof is a method of immersing the hydrogen storage alloy powder in an acid solution. As the acid solution, an organic acid solution or an inorganic acid solution may be used as long as the acid solution has the function of removing the above-mentioned passive film. For example, the acid solution may be an acid of hydrogen halide such as hydrochloric acid, hydrobromic acid, hydroiodic acid, and the like. The acid solution may be a halogen oxo acid such as hypochlorous acid, chlorous acid, chloric acid, perchloric acid, hypobromous acid, bromous acid, bromic acid, perbromic acid, hypoiodous acid, iodic acid, periodic acid, and the like. The acid solution may be nitric acid, phosphoric acid, fluorosulfonic acid, tetrafluoro boric acid, hexafluorophosphoric acid, or boric acid. The acid solution may be a sulfonic acid such as methanesulfonic acid. The acid solution may be a carboxylic acid such as formic acid and acetic acid. From the viewpoint of removal of the passive film, it is preferable to use an aqueous sulfuric acid solution as the acid solution.

Although there is no particular limitation on the time for immersing the hydrogen storage alloy powder in the acid solution, it may be immersed for 10 minutes or more. From the viewpoint of reliably removing the passive film, 30 minutes or mom is preferable. The upper limit of the immersion time is not particularly limited, but may be, for example, 180 minutes or less, preferably 120 minutes or less. From the viewpoint of efficiently performing removal of the passive film, the acid solution is preferably used in a heated state. For example, it is preferable to use an acid solution having a temperature of 40° C. or higher, preferably 60° C. or higher. The upper limit of the temperature of the acid solution is not particularly limited, but for example, the acid solution is preferably used at 100° C. or lower. Although there is no particular limitation on the heating method, it is preferable to use a hot plate.

The concentration of the acid solution is not particularly limited as long as being proper so as to be capable of removing the passive film. Further, a person of skill would understand that the proper concentration varies with the type of acid. For example, when an aqueous sulfuric acid solution is used, the concentration is preferably set to 0.1 to 0.5 mol/L. In order to suppress re-passivation by oxygen in the solution, it is preferable to use an acid solution in which oxygen in the solution is removed by bubbling an inert gas such as $N_2$ gas or Ar gas because the passive film of the hydrogen storage alloy powder is an oxide film, which can be formed by reaction with oxygen. The bubbling time is, for example, about 5 to 30 minutes.

[Cleaning Step S2a]

The cleaning step S2a is an optional step, which may be performed between the etching step S2 and the Pd film forming step S3. The cleaning step S2a is a step of cleaning the acid adhering to the hydrogen storage alloy powder after the etching step S2. As one example, water can be used to wash or clean any adhered acid. From the viewpoint of suppressing re-passivation, it is preferable to use water bubbled with an inert gas. The bubbling time can be in a range similar to the bubbling time of the etching step S2. After cleaning, the hydrogen storage alloy powder can be dried. Drying may be carried out at room temperature, but the hydrogen storage alloy powder may also be heated. For example, when heating is performed, the powder can be heated to about 80° C.

<Pd Film Forming Step S3>

The Pd film forming step S3 is performed after the etching step S2 (or after the optional cleaning step S2a). The Pd film forming step S3 is a step of covering the surface of the hydrogen storage alloy powder, which has undergone the etching step S2 (or the cleaning step S2a), with Pd by using a substitution plating method.

Generally, the formation of Pd film on a hydrogen storage alloy powder has been conventionally performed by a process of a vacuum system, such as a sputtering method. However, in such a method, the production costs are increased, which is unsuitable for mass production. An electrolytic plating method is a wet method that is also conceivable for forming a Pd film, but the electrolytic plating method is difficult to apply to the fine powder. Alternatively, as the Pd film forming method, it has been determined that it is possible to use an electroless plating method or a substitution plating method. Here, since the surface of the hydrogen storage alloy powder has high reactivity between Ti contained in the base material and oxygen in the atmosphere, it is easy to oxidize, and passivity is usually formed on the surface (such as a passivation film). Therefore, as explained above, it can be necessary to apply an acid to the surface of the hydrogen storage alloy powder immediately before or in parallel with plating to remove the passivity to activate the surface of the powder particles, and then to form a Pd coating on the surface. Further, after activation, when the hydrogen storage alloy powder is exposed to the atmosphere, again, there is a fear that passivity is formed on the surface and the powder becomes deactivated. For the above reasons, it is considered that a substitution plating method capable of simultaneously performing removal of passivity by an acid and Pd film formation is desirable. Accordingly, by adopting the substitution plating method, while suppressing production costs, it is possible to obtain a composite alloy having a high discharge capacity.

In addition, from the viewpoint of increasing the discharge capacity of the composite alloy, in the Pd film forming step S3, it is preferable to coat the hydrogen storage alloy powder with Pd under the condition that the Pd element weight ratio of the composite alloy to be produced is 0.47% or more (i.e., the weight % of the Pd is 0.47% or more when a total weight of the composite alloy is considered to be 100%). Alternatively, in the Pd film forming step S3, it is preferable to coat the hydrogen storage alloy powder with Pd under the condition that the ratio of the Pd element weight ratio to the specific surface area of the composite alloy to be produced is equal to or higher than 0.22 $g/m^2$. By satisfying either or both of these, it is possible to produce a composite alloy having a high discharge capacity. The Pd element weight ratio of the composite alloy can be measured, for example, using ICP emission spectrometry. The specific surface area of the composite alloy can be measured, for example, using the BET method.

Hereinafter, specific conditions of the Pd film forming step S3 will be described.

The Pd film forming step S3 is to immerse the hydrogen storage alloy powder in an acid solution containing a Pd salt using a substitution plating method, to substitute Pd for the surface metal of the hydrogen storage alloy powder. Although there is no particular limitation on the type of the Pd salt, it is preferable, for example, to use a Pd salt having an anion corresponding to the acid solution. For example, when an aqueous solution of sulfuric acid is used for the acid solution, palladium sulfate ($PdSO_4$) can be preferably used. Alternatively, the Pd salt may be any of the following example Pd salts. The Pd salt may be a halide such as palladium chloride, palladium bromide, and palladium iodide. The Pd salt may be a halogen oxoid such as palladium hypochlorite, palladium chlorite, palladium chlorate, palladium perchlorate, palladium hypobromite, palladium bromite, palladium bromate, palladium perbromate, palladium hypoiodite, palladium iodate, palladium periodate, and the like. The Pd salt may be palladium nitrate, palladium phosphate, palladium fluorosulfonate, palladium tetrafluoroborate, or palladium hexafluorophosphate. The Pd salt may be palladium borate of various kinds. The Pd salt may be palladium sulfonate such as palladium methanesulfonate. The Pd salt may be palladium carboxylate such as palladium formate, palladium acetate, and the like.

The amount of the Pd salt added is not particularly limited as long as the Pd coating is appropriately formed in the hydrogen storage alloy powder. For example, 0.1 g to 0.6 g of the Pd salt may be added per 10 ml of the acid solution. From the viewpoint of reliably expressing the charge-discharge activity of the composite alloy, it is preferable to add 0.2 g to 0.6 g per 10 ml of the acid solution. As the acid solution used in the Pd film forming step S3, an acid solution applicable to the etching step S2 can be used. Although the acid solution used in the Pd film forming step S3 and the acid solution used in the etching step S2 may be different from each other, it is preferable to use an acid solution of the same kind (e.g., same chemical formula). For example, an aqueous sulfuric acid solution described above for the etching step S2. In addition, from the viewpoint of suppressing re-passivation, it is preferable to use an acid solution bubbled with an inactivating gas. The bubbling time can be in a range similar to the bubbling time of the etching step S2. The concentration of the acid solution is not particularly limited because, as a person of skill in the art would understand, a proper concentration capable of removing the passive film can vary with the type of acid. For example, when an aqueous sulfuric acid solution is used, the concentration is preferably set to 0.1 mol/L to 0.5 mol/L.

The immersion time of the hydrogen storage alloy powder is not particularly limited, but is preferably set to 10 minutes or more and 60 minutes or less. The temperature of the acid solution is preferably in a heated state as in the etching step S2. For example, it is preferable to use an acid solution having a temperature of 40° C. or higher, preferably 60° C. or higher. The upper limit of the temperature of the acid solution is not particularly limited, but for example, the acid solution is preferably used at 100° C. or less.

In the Pd film forming step S3, the order in which the hydrogen storage alloy powder and the Pd salt are added to the acid solution is not particularly limited. For example, after adding the Pd salt to the acid solution, the hydrogen storage alloy powder may be immersed, or alternatively after immersing the hydrogen storage alloy powder in the acid solution, the Pd salt may be added. In the latter case, it is preferable to immerse the hydrogen storage alloy powder in the acid solution, and then remove the passivity after several minutes (e.g., 5 to 10 minutes) as a pretreatment, and then add the Pd salt. Thus, even when the amount of the Pd salt added is small, the discharge capacity can be increased. As the acid solution, an acid solution used in the etching step S2 may be used as it is, a new acid solution may be used, or a fresh acid solution may be added to the acid solution used in the etching step S2.

<Heat Treatment Step S4>

The heat treatment step S4 is a step performed after the Pd film forming step S3. The heat treatment step S4 is a step of heating the hydrogen storage alloy powder, where the Pd film is formed via the Pd film forming step S3, at a temperature of 500° C. or less. Thus it is possible to produce a composite alloy.

Figure 2:
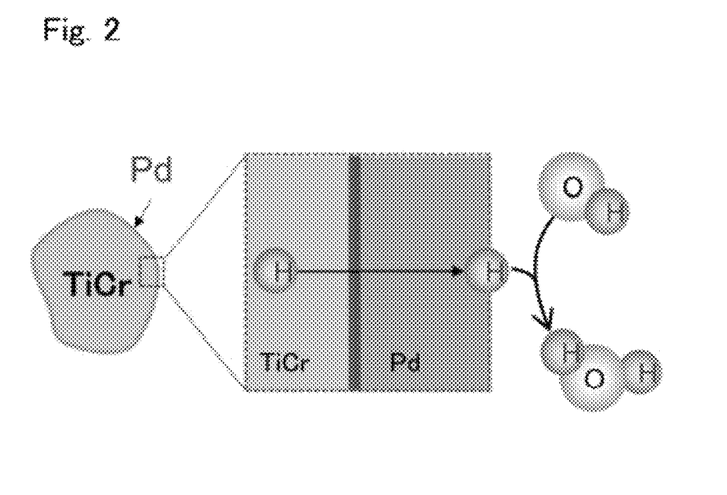
FIG. 2 is a schematic diagram of the discharge reaction of the composite alloy.

By setting the heat treatment temperature to 500° C. or less, it is possible to sufficiently proceed elemental diffusion of the solid-solid interface between Ti, Cr and the Pd coating to form a catalyst phase on the surface. Then, by forming a catalyst phase on the surface of the composite alloy, charge and discharge activity can be exhibited (FIG. 2). Further, by using the heat treatment temperature at 500° C. or less, it is possible to maintain the BCC crystal structure of the hydrogen storage alloy powder of the base material, and thus it is possible to produce a composite alloy of high discharge capacity.

A preferred temperature range of the heat treatment is 300° C. or higher and 500° C. or less. When the heat treatment temperature is less than 300° C., there is a fear that the catalyst phase is not appropriately formed. When the heat treatment temperature exceeds 500° C., there is a fear that the BCC structure of the base material collapses. The heating atmosphere is not particularly limited, and may be an (oxygen-containing) atmosphere, or may be an inert gas atmosphere, but is preferably a reduced pressure atmosphere. An inert gas atmosphere or a reduced pressure atmosphere can suppress a reaction between the hydrogen storage alloy powder and oxygen. A lower pressure of the reduced pressure atmosphere is preferable. For example, the pressure is preferably set to 100 Pa or less, and more preferably, a vacuum. The heating time is not particularly limited, but is, for example, 1 hour to 3 hours.

Incidentally, when the above heat treatment step S4 is applied to the hydrogen storage alloy powder of Patent Document 1, the heat treatment temperature is low, elemental diffusion of the solid-solid interface between Ti, Cr and the Pd coating does not proceed sufficiently, and there is a possibility that a resistive layer of H conduction remains on the surface.

Thus, the method for producing a composite alloy of the present disclosure has been described according to the method 10 for producing a composite alloy, which is an embodiment. According to the production method of the composite alloy of the present disclosure, while suppressing manufacturing costs, it is also possible to produce a composite alloy of high discharge capacity.

[Method for Producing Electrode]

Next, a method for producing an electrode for an alkaline storage battery using a composite alloy produced by the method for producing a composite alloy of the present disclosure will be described.

The method for producing an electrode for an alkaline storage battery according to the present disclosure comprises a step (electrode preparation step) of preparing an electrode using the composite alloy producing by the method for producing a composite alloy of the present disclosure, wherein a voltage difference between a charge voltage and a discharge voltage of the electrode is 0.45 V or less. The charging voltage is the plateau voltage at the time of charging, and the discharge voltage is the plateau voltage at the time of discharging. Such a voltage difference can be measured, for example, by the method of Examples described later.

<Electrode Preparation Step>

As described above, the electrode preparation step is a step of preparing an electrode using the composite alloy produced by the method for producing a composite alloy of the present disclosure.

There is no particular limitation on the preparation of the electrode, and it can be produced by a known method. For example, the electrode can be prepared by filling the composite alloy into a porous conductive member (such as foamed Ni) and roll pressing the composite alloy. Further, the electrode can be prepared by kneading an electrode material containing the composite alloy, and then applying a composition obtained in a paste form to a porous conductive member, followed by drying, and then pressing the composition at a predetermined pressure.

Although at least the composite alloy has only to be contained in the material constituting the electrode, a binder or a conductive auxiliary agent may be optionally contained. As the binder, for example, carboxy methylcellulose (CMC), polyvinyl alcohol (PVA), or the like can be used. As the conductive auxiliary agent, for example, metal particles such as Ni can be used.

As described above, the method for producing an electrode for an alkaline storage battery of the present disclosure has been described. Since the electrode produced by the method for producing an electrode for an alkaline storage battery of the present disclosure is provided with the composite alloy produced by the method for producing a composite alloy of the present disclosure, it has a high discharge capacity. Further, since the charge-discharge voltage difference of the electrode is in a predetermined range, it has a stable charge-discharge characteristics with high capacity utilization factor.

EXAMPLES

Hereinafter, the production method of the present disclosure will be further described with reference to Examples. However, the production method of the present disclosure is not limited thereto.

[Preparation of Composite Alloy]

Composite alloys according to Examples 1 to 5 and Comparative Examples 1 to 10 were prepared according to the following procedure. A composite alloy according to Reference Example 1 was prepared using barrel sputtering.

<Powder Preparation Step>

The gas atomization method was used to prepare hydrogen storage alloy powders with $Ti_{50}Cr_{50}$ compositions. Specifically, using a gas atomization device, by blowing a high-pressure Ar gas to TiCr alloy melt, it is possible to cool TiCr alloy at a rapid cooling rate capable of obtaining a metastable phase, thereby obtaining a powdery $Ti_{50}Cr_{50}$ alloy sample.

In addition, the particle size of the hydrogen storage alloy powder was adjusted to 38 μm to 100 μm using a predetermined sieve. The powder exceeding 100 μm was subjected to a grinding treatment, and the particle size was adjusted again using a sieve.

<Etching Step>

According to each condition described in Table 1, the hydrogen storage alloy powder prepared was immersed in an acid solution. The etching step was not performed in Condition 9. Here, GB of the processing atmosphere in Table 1 means a glove box. The H/P of the heating method indicates a state in which a beaker containing an acid solution is heated from the lower portion and treated using a hot plate. O/B denotes a state in which a beaker containing an acid solution was overall heated and treated using an oil bath. "bubble generation" described in Condition 2 means that hydrogen gas has been generated. Hydrogen gas is generated when the passive film is removed by the acid and TiCr alloy of the base material is eluted into the acid.

<Cleaning Step>

According to each condition described in Table 1, with respect to the hydrogen storage alloy powder subjected to the etching step, using water bubbled with an inert gas, the acid adhering was cleaned away. No cleaning step was performed in Conditions 1, 2 and 9.

<Pd Film Forming Step>

According to each condition described in Table 1, a substitution plating method was used to form a Pd coating on the hydrogen storage alloy powder subjected to the etching step or the cleaning step. Here, in Conditions 1 and 2, the Pd film forming step was performed using the acid solution of the etching step as it was. In Condition 9, t the Pd film forming step was performed without performing the etching step or the cleaning step. Further, regarding the symbol "Pd→MH" in the "adding sequence" row in Table 1, this means that a Pd salt ($PdSO_4$) was added to the acid solution ($H_2SO_4$ aqueous solution) to be uniformly stirred, and thereafter the hydrogen storage alloy powder (MH) was added thereto. In addition, the symbol "MH→Pd" means that the hydrogen storage alloy powder (MH) after cleaning was added to a new acid solution, and after the etching treatment (treatment time before Pd addition: 5 minutes) was performed again, the Pd salt ($PdSO_4$) was added. Further, the treatment time was the time counted from the time when the hydrogen storage alloy powder and Pd salt were added to the acid solution.

<Heat Treatment Step>

According to each condition described in Table 2, the hydrogen storage alloy powder subjected to the Pd film forming step was heated to prepare a composite alloy. Comparative Examples 1 to 3 were not subjected to heat treatment.

Thus, composite alloys according to Examples 1 to 5 and Comparative Examples 1 to 10 were prepared.

<Barrel Sputtering>

Barrel sputtering was used to form a Pd coating on the hydrogen storage alloy powder prepared in the powder preparation step. The barrel sputtering conditions are as follows: using a barrel sputtering device manufactured by Furuya Metal Co., Ltd., TiCr material powder was coated with Pd while being rotated and stirred, and the sputtering coating was performed so that the thickness of the coating layer became 10 nm. Then, the obtained hydrogen storage alloy powder was subjected to heat treatment under the conditions described in Table 2. Thus a composite alloy according to Reference Example 1 was obtained.

[Evaluation]

The performance of the prepared composite alloys was evaluated by the following method.

<Pd Element Weight Ratio>

Figure 3:
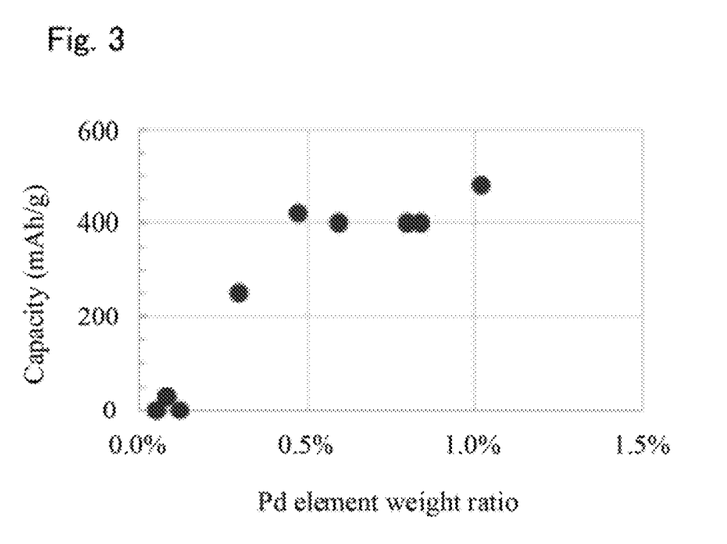
FIG. 3 is a diagram showing the Pd element weight ratio of the composite alloy in Examples.
Figure 4:
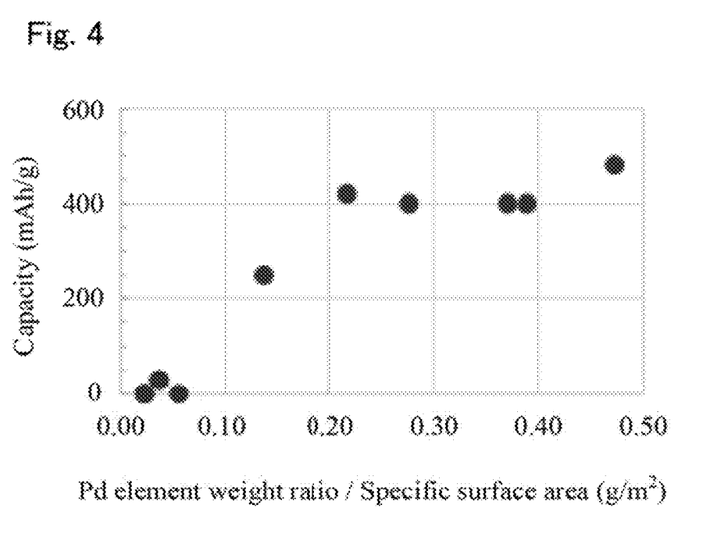
FIG. 4 is a diagram showing the Pd element weight ratio/specific surface area of the composite alloy in an Example.

For the prepared composite alloys, the Pd element weight ratio was determined using ICP emission spectrometry. Further, using the BET method, the specific surface area of the composite alloy was measured to calculate the ratio of Pd element weight ratio to the specific surface area of the composite alloy. The results are shown in Table 2, and FIGS. 3 and 4. Note that measurement was not performed for Comparative Examples 1 to 4 and Reference Example 1.

<Discharge Capacity>

The composite alloy prepared was filled in foamed Ni (network-shaped Ni metal structure), to prepare a working electrode (negative electrode) by roll pressing at a predetermined pressure. Two β-Ni(OH)$_2$ electrodes were used as the counter electrode (positive electrode). Also, a Hg/HgO electrode was used as the reference electrode. Here, the capacity ratio of the working electrode to the counter electrode was adjusted to about 1:3. Further, a nonwoven fabric made of PE/PP was used as a separator, and 6M KOH was used as an electrolytic solution. Batteries were prepared by assembling these members. Specifically, the negative electrode was sandwiched by the positive electrode and arranged so as to be a positive electrode-negative electrode-positive electrode. Next, a separator was disposed between the positive electrode and the negative electrode, and the electrolytic solution was filled to prepare a battery.

Figure 5:
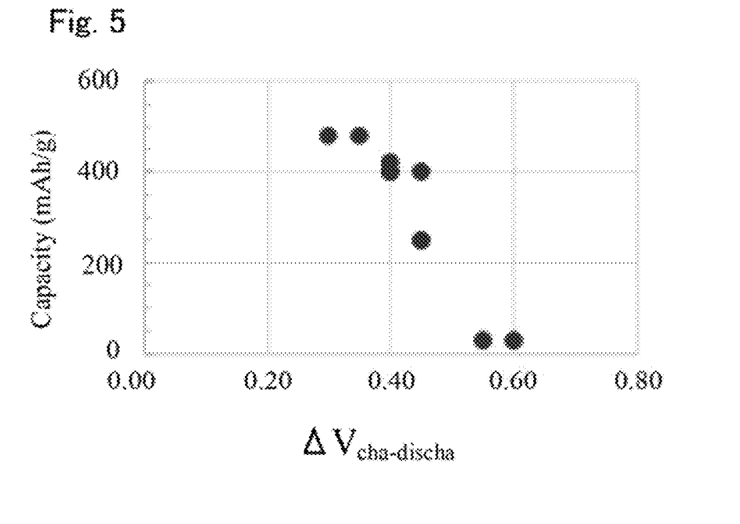
FIG. 5 is a diagram showing voltage differences of the negative electrodes in Examples.
Figure 6:
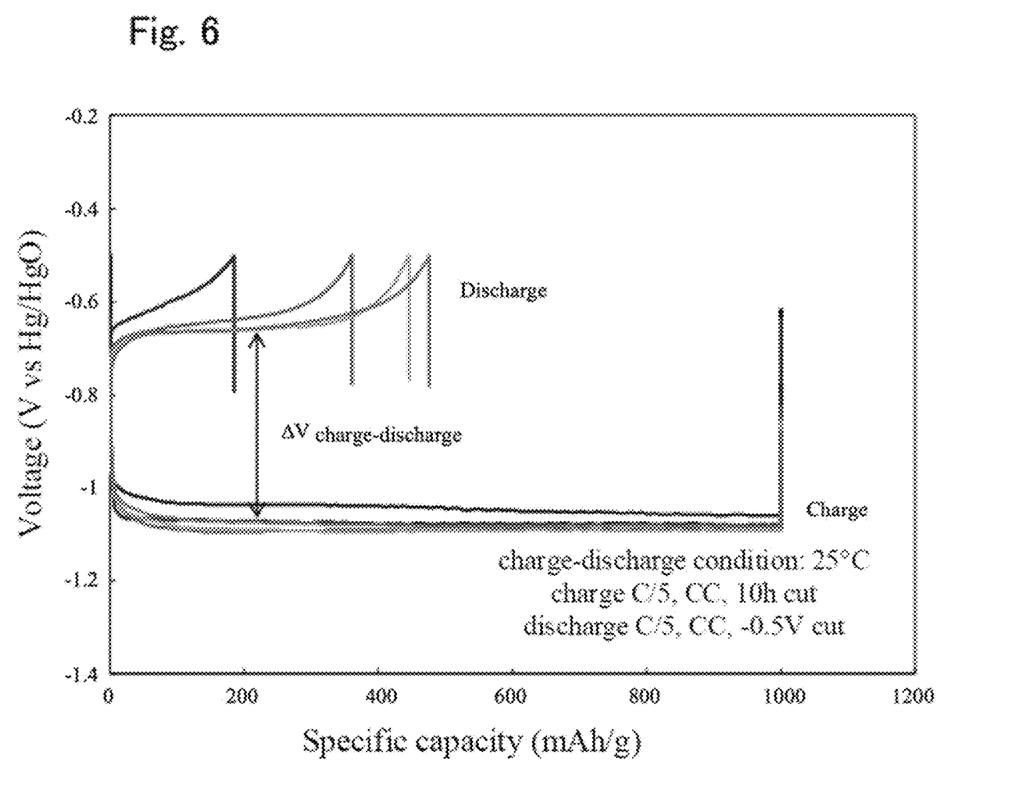
FIG. 6 is charge-discharge curves up to the fifth cycle of Example 5.

Then, using the prepared battery, it was subjected to 10 cycles of charging and discharging. Charging condition is to perform constant current charging for 10 hours at C/5. The discharging condition is to perform constant current discharging until the voltage of the working electrode became 0.5 V at C/10. From the results obtained, discharge capacity and charge-discharge voltage difference were obtained. Further, given the theoretical capacity of the TiCr alloy as 530 mAh/g, by dividing the actual discharge capacity of the fifth cycle when performing the above charging and discharging 5 cycles by the theoretical capacity, utilization was calculated. The results are shown in Table 2 and FIG. 5. Further, as a reference, the charge-discharge curves up to the fifth cycle of Example 5 is shown in FIG. 6.

TABLE 1

| | | condition No. | 1 | 2 | 3 | 4 | 5 | 6 |
|---|---|---|---|---|---|---|---|---|
| Etching step | acid solution | treatment atmosphere | air | air | GB | GB | GB | GB |
| | | type of acid | $H_2SO_4$ | $H_2SO_4$ | $H_2SO_4$ | $H_2SO_4$ | $H_2SO_4$ | $H_2SO_4$ |
| | | concentration (mol/L) | 0.5 | 0.5 | 0.5 | 0.5 | 0.5 | 0.5 |
| | | solution amount (ml) | 10 | 10 | 10 | 10 | 10 | 10 |
| | | Ar bubling (30 min) | — | — | performed | performed | performed | performed |
| | | temperature (° C.) | 60 | 60 | 60 | 60 | 60 | 60 |
| | | heating method | H/P | O/B | H/P | H/P | H/P | H/P |
| | | treatment time (min) | 120 | 10 | 30 | 30 | 30 | 30 |
| | | supplementary of treatment | — | bubble generation | — | — | — | — |
| Cleaning step | performed or not performed | | not performed | not performed | performed | performed | performed | performed |
| | solution | type | — | — | $H_2O$ | $H_2O$ | $H_2O$ | $H_2O$ |
| | | Ar bubling (5 min) | — | — | performed | performed | performed | performed |
| | drying after cleaning | temperature (° C.) | — | — | 80 | 80 | 80 | 80 |
| Pd film forming step | acid solution | type | — | — | $H_2SO_4$ | $H_2SO_4$ | $H_2SO_4$ | $H_2SO_4$ |
| | | concentration (mol/L) | — | — | 0.05 | 0.01 | 0.5 | 0.1 |
| | | Ar bubling (30 min) | — | — | performed | performed | performed | performed |
| | | Pd salt | $PdSO_4$ | $PdSO_4$ | $PdSO_4$ | $PdSO_4$ | $PdSO_4$ | $PdSO_4$ |
| | | additional amount (g) | 0.2 | 0.2 | 0.1 | 0.1 | 0.1 | 0.1 |
| | | temperature (° C.) | — | — | 60 | 60 | 60 | 60 |
| | | treatment time (min) | 30 | 30 | 30 | 30 | 30 | 30 |
| | | adding sequence | MH→Pd | MH→Pd | Pd→MH | Pd→MH | Pd→MH | MH→Pd |
| | base material | type | $Ti_{50}Cr_{50}$ | $Ti_{50}Cr_{50}$ | $Ti_{50}Cr_{50}$ | $Ti_{50}Cr_{50}$ | $Ti_{50}Cr_{50}$ | $Ti_{50}Cr_{50}$ |
| | | particle diameter (μm) | 38-100 | 38-100 | 38-100 | 38-100 | 38-100 | 38-100 |
| | | amount (g) | 3 | 3 | 3 | 3 | 3 | 3 |
| | | treatment time before Pd adding (min) | — | — | — | — | — | — |

| | | condition No. | 7 | 8 | 9 | 10 | 11 | 12 |
|---|---|---|---|---|---|---|---|---|
| Etching step | acid solution | treatment atmosphere | GB | GB | air | GB | GB | GB |
| | | type of acid | $H_2SO_4$ | $H_2SO_4$ | — | $H_2SO_4$ | $H_2SO_4$ | $H_2SO_4$ |
| | | concentration (mol/L) | 0.5 | 0.5 | — | 0.5 | 0.5 | 0.5 |
| | | solution amount (ml) | 10 | 10 | — | 10 | 10 | 10 |
| | | Ar bubling (30 min) | performed | performed | — | performed | performed | performed |
| | | temperature (° C.) | 60 | 60 | — | 60 | 60 | 60 |
| | | heating method | H/P | H/P | — | H/P | H/P | H/P |
| | | treatment time (min) | 30 | 30 | — | 30 | 30 | 30 |
| | | supplementary of treatment | — | — | — | — | — | — |
| Cleaning step | performed or not performed | | performed | performed | — | performed | performed | performed |
| | solution | type | $H_2O$ | $H_2O$ | — | $H_2O$ | $H_2O$ | $H_2O$ |
| | | Ar bubling (5 min) | performed | performed | — | performed | performed | performed |
| | drying after cleaning | temperature (° C.) | 80 | 80 | — | 80 | 80 | 80 |
| Pd film forming step | acid solution | type | $H_2SO_4$ | $H_2SO_4$ | $H_2SO_4$ | $H_2SO_4$ | $H_2SO_4$ | $H_2SO_4$ |
| | | concentration (mol/L) | 0.1 | 0.05 | 0.1 | 0.1 | 0.1 | 0.1 |
| | | Ar bubling (30 min) | performed | performed | — | performed | performed | performed |
| | | Pd salt | $PdSO_4$ | $PdSO_4$ | $PdSO_4$ | $PdSO_4$ | $PdSO_4$ | $PdSO_4$ |
| | | additional amount (g) | 0.1 | 0.1 | 0.1 | 0.2 | 0.4 | 0.5 |
| | | temperature (° C.) | 60 | 60 | 60 | 60 | 60 | 60 |
| | | treatment time (min) | 30 | 30 | 30 | 30 | 30 | 30 |
| | | adding sequence | MH→Pd | MH→Pd | Pd→MH | Pd→MH | Pd→MH | Pd→MH |
| | base material | type | $Ti_{50}Cr_{50}$ | $Ti_{50}Cr_{50}$ | $Ti_{50}Cr_{50}$ | $Ti_{50}Cr_{50}$ | $Ti_{50}Cr_{50}$ | $Ti_{50}Cr_{50}$ |
| | | particle diameter (μm) | 38-100 | 38-100 | 38-100 | 38-100 | 38-100 | 38-100 |
| | | amount (g) | 3 | 3 | 3 | 3 | 3 | 3 |
| | | treatment time before Pd adding (min) | 5 | 5 | — | — | — | — |

TABLE 2

| | base material | Pd film type | Pd film forming method | heating treatment condition | discharge capacity (mAh/g) | utilization ratio (%) | charge – discharge voltage difference (V) | Pd element weight ratio (%) | Pd element weight ratio/ specific surface area (g/m$^2$) |
|---|---|---|---|---|---|---|---|---|---|
| Comparative Example 1 | $Ti_{50}Cr_{50}$ | Pd | — | — | 0 | 0 | | | |
| Comparative Example 2 | $Ti_{50}Cr_{50}$ | Pd | condition 2 | none | 0 | 0 | | | |
| Comparative Exemple 3 | $Ti_{50}Cr_{50}$ | Pd | condition 12 | none | 0 | 0 | | | |
| Example 1 | $Ti_{50}Cr_{50}$ | Pd | condition 1 | vacuum, 500° C., 2 hr | 400 | 75 | 0.4 | 0.80 | 0.37 |
| Comparative Example 4 | $Ti_{50}Cr_{50}$ | Pd | condition 2 | vacuum, 500° C., 2 hr | 250 | 47 | 0.45 | | |
| Comparative Example 5 | $Ti_{50}Cr_{50}$ | Pd | condition 3 | vacuum, 500° C., 2 hr | 30 | 8 | 0.6 | 0.08 | 0.04 |
| Comparative Example 6 | $Ti_{50}Cr_{50}$ | Pd | condition 4 | vacuum, 500° C., 2 hr | 0 | 0 | | 0.12 | 0.06 |
| Comparative Example 7 | $Ti_{50}Cr_{50}$ | Pd | condition 5 | vacuum, 500° C., 2 hr | 0 | 0 | | 0.05 | 0.02 |
| Comparative Example 8 | $Ti_{50}Cr_{50}$ | Pd | condition 6 | vacuum, 500° C., 2 hr | 0 | 0 | | 0.05 | 0.02 |

TABLE 2-continued

| | base material | film type | Pd film forming method | heating treatment condition | discharge capacity (mAh/g) | utilization ratio (%) | charge – discharge voltage difference (V) | Pd element weight ratio (%) | Pd element weight ratio/ specific surface area (g/m$^2$) |
|---|---|---|---|---|---|---|---|---|---|
| Example 2 | Ti$_{50}$Cr$_{50}$ | Pd | condition 7 | vacuum, 500° C., 2 hr | 400 | 75 | 0.4 | 0.60 | 0.28 |
| Comparative Example 9 | Ti$_{50}$Cr$_{50}$ | Pd | condition 8 | vacuum, 500° C., 2 hr | 250 | 47 | 0.45 | 0.30 | 0.14 |
| Comparative Example 10 | Ti$_{50}$Cr$_{50}$ | Pd | condition 9 | vacuum, 500° C., 2 hr | 30 | 6 | 0.55 | 0.08 | 0.04 |
| Example 3 | Ti$_{50}$Cr$_{50}$ | Pd | condition 10 | vacuum, 500° C., 2 hr | 420 | 79 | 0.4 | 0.47 | 0.22 |
| Example 4 | Ti$_{50}$Cr$_{50}$ | Pd | condition 11 | vacuum, 500° C., 2 hr | 400 | 75 | 0.45 | 0.84 | 0.39 |
| Example 5 | Ti$_{50}$Cr$_{50}$ | Pd | condition 12 | vacuum, 500° C., 2 hr | 480 | 91 | 0.35 | 1.02 | 0.47 |
| Reference Example 1 | Ti$_{50}$Cr$_{50}$ | Pd | barrel sputtering | vacuum, 500° C., 2 hr | 480 | 91 | 0.3 | | |

[Results]

As shown in Table 2, Examples 1 to 5 had the same discharge capacity as in Reference Example 1. Therefore, even when a replacement plating method in place of barrel sputtering was used, it was confirmed that the electrode having a high discharge capacity can be prepared. Further, from FIG. 3, when the Pd element weight ratio of the composite alloy was 0.47% or more, it was found that a high discharge capacity can be obtained. Similarly, from FIG. 4, when the ratio of the Pd element weight ratio to the specific surface area of the composite alloy was 0.22 g/m$^2$ or more, it was found that a high discharge capacity can be obtained. Furthermore, from FIG. 5, when the charge-discharge voltage difference in the negative electrode was 0.45 or less, it was found that the utilization ratio is high, and a high discharge capacity can be obtained.

Comparative Examples 1 to 3 did not exhibit charge and discharge activity. This is considered to be because, since the heat treatment step was not performed, the catalyst phase was not adapted to the composite alloy.

Comparative Example 4 was obtained by preparing a composite alloy under the same conditions as in Example 1, but the acid treatment time in the etching step was as short as 10 minutes as compared to 120 minutes of Condition 1. Therefore, since the passive film is thought to have remained in a portion of the composite alloy, the discharge capacity was reduced as compared with Example 1.

In Comparative Examples 5 to 8, while the composite alloy was prepared under different conditions for the concentration of the acid solution in the Pd coating step, discharge capacity was extremely low or charge and discharge activity results were not expressed. This is considered to be because the removal of passivity and the formation of the Pd coating were not compatible. For example, comparing Example 2 with Comparative Example 8, Example 2 was subjected to pretreatment before the addition of Pd salt, since this promoted the removal of passivity, even when the amount of Pd salt added is small, a Pd coating was appropriately formed. On the other hand, since Comparative Example 8 was not subjected to pretreatment, it is considered that the amount of Pd added was small (comparison with Example 3), and a Pd coating was not appropriately formed.

Comparative Example 9 is a test example in which the etching step and the cleaning step were not performed. In such a case, in the Pd film forming step, it is considered that the removal of passivity of the hydrogen storage alloy powder did not proceed properly, and therefore, the Pd film was not appropriately formed, so that the discharge capacity has become extremely low results.

What is claimed is:

1. A method for producing a composite alloy for use in an electrode for an alkaline storage battery, comprising:
    a powder preparation step of preparing a hydrogen storage alloy powder having a BCC structure and containing Ti and Cr;
    an etching step of applying an acid to the hydrogen storage alloy powder prepared in the powder preparation step;
    a Pd film forming step of coating a surface of the hydrogen storage alloy powder subjected to the etching step with Pd using a substitution plating method; and
    a heat treatment step of heating the hydrogen storage alloy powder having the Pd film formed, said heating being at a temperature of 500° C. or less,
    wherein in the Pd film forming step, the hydrogen storage alloy powder is coated with the Pd under a condition that a Pd element weight ratio of the composite alloy to be produced is 0.47% or more.

2. The production method according to claim 1, wherein in the Pd film forming step, the hydrogen storage alloy powder is coated with the Pd under a condition that a ratio of the Pd element weight ratio to a specific surface area of the composite alloy is equal to or higher than 0.22 g/m$^2$.

3. The production method according to claim 1, wherein the hydrogen storage alloy contains the Ti and the Cr and is substantially free of other elements.

4. A method for producing an electrode for an alkaline storage battery, the method comprising:
    a step of producing an electrode comprising the composite alloy produced by the production method according to claim 1,
    wherein a voltage difference between a charge voltage and a discharge voltage of the electrode is 0.45 V or less.

* * * * *